United States Patent Office 3,325,858
Patented June 20, 1967

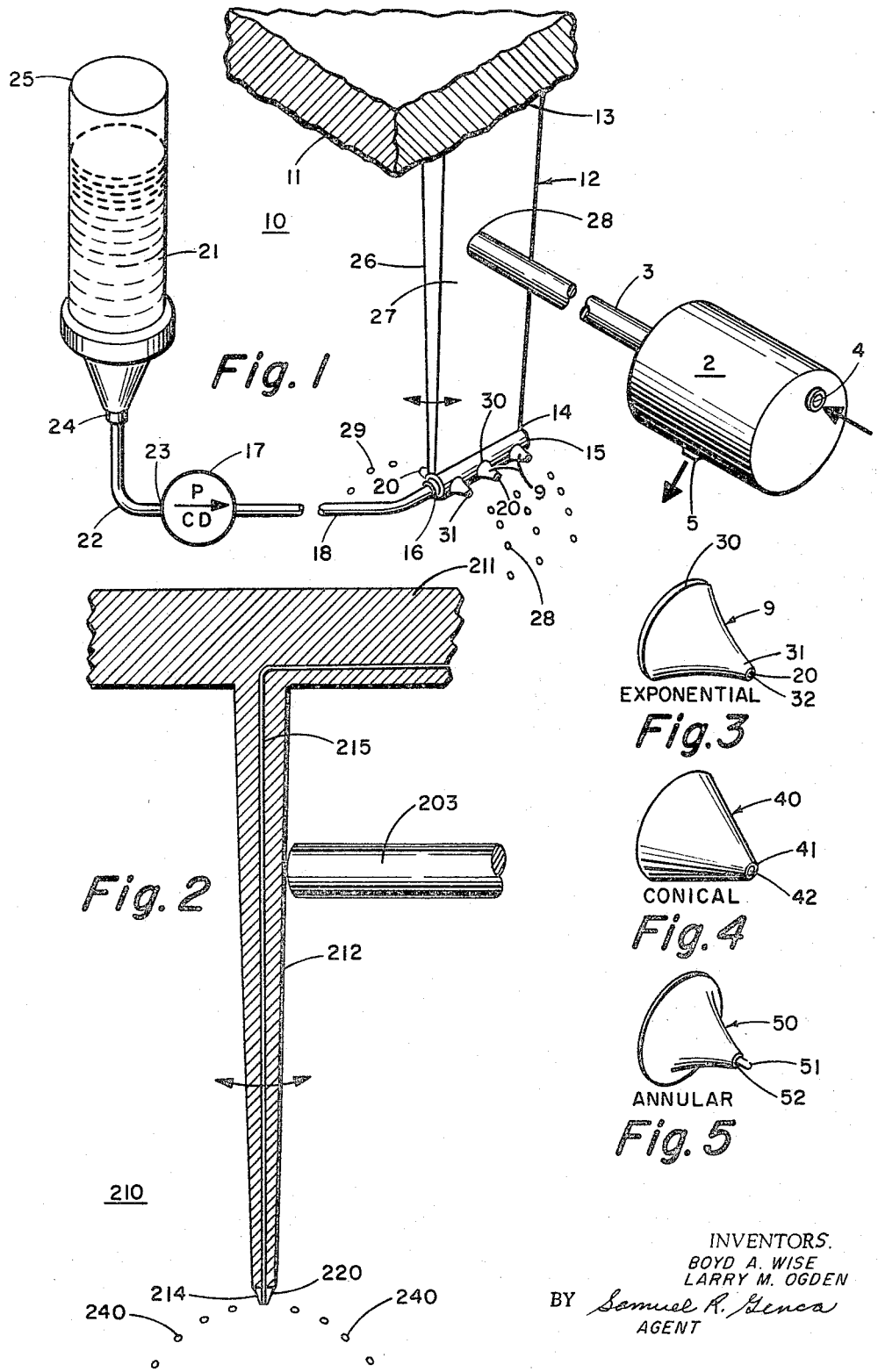

3,325,858
SONIC APPARATUS
Larry M. Ogden and Boyd A. Wise, Penfield, N.Y., assignors to General Dynamics Corporation, a corporation of Delaware
Filed Oct. 2, 1964, Ser. No. 401,097
10 Claims. (Cl. 18—2.7)

The present invention relates to an improved apparatus for converting by sonic means a liquid into uniform particles.

Although the present invention has various fields of use, it is particularly adapted for converting high viscosity liquids such as liquid plastics and resins into uniform particles, each being substantially spherical in shape and having a given mass.

With the ever increasing use of plastic articles, there is a need for converting a high viscosity liquid plastic into plastic particles of uniform size and weight which when hardened can be used in molding, casting and other manufacturing processes. In the past, hardened plastic particles or granules have been produced by costly and time consuming operations such as breaking, crushing, and hammer or ball-milling slabs of plastics followed by a screening operation to select particles of desired size. The slabs of plastic were generally obtained by pouring molten plastic or resin into a water-cooled or air-cooled pan. For example, the production of thermosetting resin particles, such as phenolformaldehyde, employs such operations as breaking, crushing, hammer milling and screening for producing particles of resin. Such production techniques are described in a publication Chemical Engineering Series-The Chemical Process Industries, by R. Norris Shreve, pages 778 and 779 Second Edition, copyright 1956 by McGraw-Hill Book Company, Inc., of New York.

Particles produced by these known techniques are generally irregular in shape and weight, even though they are screened for size. The crushing operation sometimes causes degradation of the plastic or resin. These irregularly shaped particles tend to create problems in molding operations since they do not generally transfer heat rapidly and uniformly. The irregularly shaped particles require a longer molding operation cycle than uniform spherically shaped particles of equal weight. Further, the irregularly shaped particles tend to cause flaws in molded plastic articles.

A high viscosity liquid, such as a liquid plastic, is not easily atomized or pulled apart because it is tenacious and has a high shear strength. Considerable energy is required to convert it into particles, particularly when the liquid stream or column is large, as for large particles. Piezoelectric, electrostrictive and magnetostrictive apparatus of the known prior art tend to vibrate at low amplitudes and relatively low power, so that they are not particularly suited for converting high viscosity liquids into particles. This is especially true when the particle size is greater than the amplitude of vibration.

It is an object of the present invention to provide improved sonic apparatus.

Another object of the present invention is to provide sonic apparatus which derives particles directly from a liquid through the use of sonic energy. By sonic energy is meant the entire range of vibratile energy including acoustic, subacoustic and ultrasonic energy.

It is still another object of the present invention to provide a sonic apparatus for converting a high viscosity liquid into particles of given mass and substantially spherical shape.

In accordance with this invention, a steady stream or column of high viscosity liquid is pulled apart segmentally by imparting a given inertia, in one direction, to a leading segment or portion of the liquid column while driving the remaining liquid column in the opposite direction. A shearing force developed by virtue of the inertial and driving forces exceeds the shear strength of the liquid column so that the leading segment is pulled or sheared from the remaining liquid column or stream. The process is cyclic in nature; one particle is broken from the column each time the inertia of the column is reversed. Particles of a given size and mass may be obtained by maintaining the inertia imparted to each leading segment substantially constant. More specifically sonic apparatus according to a preferred embodiment of the invention employs a high acoustic energy source such as a hydroacoustic vibration generator described in U.S. Letters Patent No. 3,105,460 for "Hydroacoustic Oscillator-Amplifier" to J. V. Bouyoucos or in an application for a U.S. Letters Patent Ser. No. 151,516 for "Electro-Hydroacoustic Transducer," filed Nov. 10, 1961 by J. V. Bouyoucos, now U.S. Letters Patent No. 3,212,473. Such vibration generators derive high acoustic energy by modulating an otherwise uniform flow of a fluid medium, and in so doing, originate pressure variations, these arising from the alternate fluid acceleration and decelerations accompanying the modulatory process. A member couples the pressure variations in the vibration generator to a load.

The sonic apparatus comprises a frame, a reed blade having one end fixed to the frame and the other end free to vibrate, and a vibration generator, for example of the hydroacoustic type, coupled to the reed blade at a point along its length near the fixed end of the blade. This provides vibration amplification at the free end of the blade for vibrations introduced in the blade by the vibration generator. The sonic apparatus further includes a liquid chamber fixed at the free end of the reed blade. The liquid chamber includes an input port connected to a source of the high viscosity liquid under pressure and a plurality of output ports for extruding columns of the liquid and directing the liquid columns away from the blade. The liquid is extruded at a uniform rate.

The vibration generator vibrates the reed blade in a flexural mode so that an antinode is established at the free end of the blade. A maximum value of inertia is thereby imparted to a lead portion or segment of the extruding column of liquid at the free end of the blade.

The time duration of each vibration and the uniform rate of extrusion of the liquid column, along with the speed of the free end of the blade determine the mass and inertia of the particle or sheared lead segment of the liquid column. The blade is vibrated at a constant frequency at or near its resonant frequency so that the time duration of each vibration and speed of the free end of the blade are kep constant.

The invention will be disclosed more fully with reference to the accompanying drawings, in which:

FIG. 1 is a diagrammatic, elevational view, partly broken away, illustrating sonic apparatus in accordance with the invention;

FIG. 2 is a fragmentary sectional view of portions of sonic apparatus according to another embodiment of the invention.

FIGS. 3 to 5 are perspective views of various output ports which may be utilized in the sonic apparatus of FIGS. 1 and 2.

Referring now to FIG. 1, there is shown a sonic apparatus in accordance with the invention designated generally by the reference numeral 10. The sonic apparatus 10 comprises a frame 11, a reed blade 12, having one end 13 fixed to the frame 11 and the other end 14 free to vibrate, and a liquid chamber 15 fixed to the free end 14 of the blade 12. The chamber 15 is fixed to the free end 14 of the blade 12 as by welding. The liquid chamber 15 can however be an integral part of the free end 14 of the blade 12, that is the chamber 15 and blade 12 may be machined from a single piece of elastic material such as steel, phosphor bronze or the like. The chamber 15 includes an input port 16 connected to a constant delivery pump 17 through a flexible line 18. The flexible line 18 is made of an elastic material which will not readily break under strain and fatigue due to vibrations. Such materials are well known to those skilled in the art and may be, for example, rubber, steel or the like.

The chamber 15 includes a plurality of output ports 20 for extruding therethrough a high viscosity liquid, such as a liquid plastic and liquid resin under pressure in the chamber 15. The liquid in chamber 15 is converted by the sonic apparatus 10 into uniform particles in a manner to be described hereinafter. The liquid is supplied under pressure to the chamber 15 from a tank or reservoir 21 through the constant delivery pump 17. A conduit line 22 is connected between the input terminal 23 of the constant delivery pump 17 and the output terminal 24 of the reservoir 21. Although a constant delivery pump 17 is illustrated as supplying the liquid under pressure to the chamber 15 other means may be used without departing from the invention. Such other means for example may include a compressed gas between the top of the liquid and a closed cover 25 (not shown) of the reservoir 21.

The structure 9 containing the output port 20 may be attached or made an integral part of the chamber 15 on opposite sides thereof in a manner well known to those skilled in the art, namely mechanical threads, copper brazing or welding. Although only three output ports 20 are shown on one side of the chamber 30, more or less output ports 20 may be added to the chamber 15. The length of the chamber 15 and the width of the blade 12 principally determine the number of output ports 20 on the chamber 15.

The output ports 20 direct the liquid away from both faces 26 and 27 of the blade 12 and extrude the liquid into streams or columns at a flow rate which is a function of the pressure of the liquid in the chamber 15 and the liquid resistance of the output port 20. By maintaining the liquid pressure constant within the chamber 15, a steady uniform rate of liquid extrusion can be achieved.

The structure 9 containing the output port 20 of the sonic apparatus 10 is shown more in detail in FIG. 3. The output structure 9 has an exponential shape which has a variable cross-sectional area along the longitudinal axis. The output port structure 9 has a portion 30 proximal to the chamber 15, a portion 31 which is distal to the chamber 15 and a channel 32 along the longitudinal axis of the output structure 9. The portion 31 has a very small cross-sectional area or knife-like edge around the channel 32 so as to reduce the adhesive force or attraction between the structure 9 and the liquid which is being extruded through the output port 20. It has been found that this feature reduces the possibility of the liquid adhering to the structure 9 and of obtaining liquid particles of different weight as will be explained more in detail in the operation of the sonic apparatus 10. Although the output port structure 9 is illustrated as having an exponential shape, other pointed shapes may be used, for example a conical shape as shown in an output port structure 40 of FIG. 4. An apex 41 of the conical output 40 has a knife-like edge around a channel 42 which extends through the longitudinal axis of the output port 40.

The output ports 20 may be disposed radially around the chamber 15 and at any angle around the free end 14 of the blade 12 provided the output ports 20 direct the extruding liquid colums away from the blade 12. For a given size blade 12 and frequency of vibration, the radial position of the output ports 20 determine the size of the liquid particle. The output ports 20 of the sonic apparatus 10 are disposed substantially normal to the faces 26 and 27 of the blade 12 to obtain a larger particle size than if the output ports 20 were placed radially on the chamber 15 along the longitudinal axis of the blade 12 or at some point therebetween. The sonic apparatus 210 of FIG. 2 has an output port 220 along the longitudinal axis of a blade 212 to obtain a smaller size particle than the particle obtained by the sonic apparatus 10 for the same liquid extrusion rate and vibrational forces applied on the blade 12. The reason for this is that the liquid column which is extruded from the output port 20 of sonic apparatus 10 has a growing time $T_1$ which is substantially equal to the time period of one complete vibrational cycle while the liquid column being extruded from output port 220 of sonic apparatus 210 has a growing time $T_2$ which is about one half of the growing time $T_1$ or the duration of one half cycle of vibration.

The blade 12, as was mentioned previously, is made of an elastic material and vibrates at or near its natural or resonant frequency in a flexural mode. The free end 14 of the blade 12 vibrates in an arcuate plane which is transverse to a plane through the longitudinal axis of the blade 12. The blade 12 vibrates as a reed, therefore, the free end 14 has a maximum displacement on each side of a neutral or rest position of the blade 12. The vibrating blade 12 has an antinode at its free end 14. The peak amplitude or maximum displacement of the free end 14 occurs at the antinode. A half cycle of vibration is considered to be from one maximum displacement of the free end 14 on one side of the neutral position to the maximum displacement on the other side of the neutral position.

The blade 12 is excited into vibrations by a vibration generator 2 coupled to the blade 12 at a point 28 along the length of the blade 12 by a piston member 3. The point 28 is proximal to the fixed end 13 of the blade 12 so as to provide a displacement amplification at the free end 14 in response to forced vibrations at point 28 by the vibration generator 2. The vibration generator 2 in a preferred embodiment of the invention is a hydroacoustic vibration generator of the type described in U.S. Letters Patent No. 3,105,460 for "Hydroacoustic Oscillator-Amplifier" and in an application for a U.S. Letters Patent Ser. No. 151,516 for "Electro-Hydroacoustics Transducer" filed Nov. 10, 1961 by J. V. Bouyoucos.

Hydroacoustic vibration generators derive high acoustic energy by modulating an otherwise uniform flow of a fluid medium, and in so doing, originate pressure variations thus arising from the alternate fluid accelerations and decelerations accompanying the modulatory process. A radiating element (not shown) couples the pressure variations to the piston member 3. The fluid medium is introduced under pressure into the hydroacoustic vibration generator 2 at inlet 4 and exits at outlet 5.

The hydroacoustic vibration generator 2 is especially suitable for high viscosity liquids, since these liquids do not easily atomize or break apart at low power levels. However, other vibration generators such as magnetostrictive, piezoelectric, electrostrictive, and mechanical vibration generators may be used particularly for handling lower viscosity liquids.

In the operation of the sonic apparatus 10 of FIG. 1, the liquid from reservoir 21 is pumped under pressure into the chamber 15 by the pump 17 through the flexible line 18. The liquid may be for example melted liquid metal, plastic or resin which can be converted into particles 28 and 29 on each side of the chamber 15. The liquid is extruded from the chamber 15 through the output ports 20 on both sides of the chamber 15 at a uniform rate into steady streams or columns (not shown). While the liquid is being extruded through the output ports 20, the blade 12 is vibrated in a steady state condition at or near its resonant frequency by the vibrator generator 2. When the blade 12 is vibrated in the steady state condition, the extruded streams or columns on each side of the chamber 15 grow at the same uniform rate for each complete cycle of vibration but at a different phase relationship. That is, for example a liquid column on the left side of the chamber 15 is still growing at the end of a half cycle which occurs at the maximum displacement of the blade 12 on the right side of the neutral position. The liquid column on the right side of the chamber has grown for one complete cycle of vibration of the blade 12 to the right of the neutral position at or near the maximum displacement of blade 12. A lead portion of the liquid column moving to the right now has a given mass, speed and inertia which keeps the lead portion moving in the same direction even though the blade 12 moves in a reverse direction after it reaches its maximum displacement. The lead portion of the column going to the right side develops a shearing force by virtue of the inertial and driving forces generated by the vibrating blade 12. This shearing force exceeds the shear strength of the liquid and causes the lead portion of the column to be pulled apart or sheared from the liquid column or stream at the output port 20 to form particle 28. The same action is repeated when the columns on the left side of chamber 15 move to the left. The columns on the right side of the chamber 15 grow during the period the blade 12 moves to the left as mentioned previously. The blade 12 vibrates at a constant frequency and amplitude so that the energy imparted to the lead portions of the extruding columns are substantially constant. Thus, by imparting a uniform inertia on the lead portions of the liquid columns, the lead portions are pulled apart or sheared from the liquid stream or column to form particles 28 and 29. Since there are two series of output ports 20 and liquid columns on opposite sides of the chamber 15, two series of liquid particles 28 and 29 are produced for each complete cycle of vibration. The sheared particles 28 and 29 free fall and form into substantially spherical bodies as in the case for free falling droplets.

The sonic apparatus 10 is ideally suited for producing plastic particles from a liquid because the plastic particles can now be produced directly from a melted plastic source without first hardening the plastic liquid and then breaking, crushing and hammer-milling the hardened plastic as in the prior art. By extruding the liquid plastic at a uniform rate and imparting a given accelleration to the liquid column, a lead portion of the column will tend to remain in motion in the same direction when the liquid column is rapidly moved in the reversed direction. The lead portion, by reason of its mass and velocity derives an inertial force which exceeds the shear strength of the liquid. Thus the steps of extruding a liquid column at a uniform rate and then cyclically moving the liquid column in one direction for a given period of time and then reversing the direction of travel causes a lead portion of a given mass to leave the column each time the motion of the liquid column is reversed. The sheared lead portions free fall and develop in substantially spherical shapes which roll, pour freely and transfer heat substantially uniformly.

FIG. 2 shows another embodiment of the invention which differs from the sonic apparatus 10 of FIG. 1 by the means of feeding the liquid to the output ports. The means for feeding the liquid to the output port 220 includes a channel or longitudinal chamber 215 extending through the length of the blade 212, through the frame 211. The channel 215 is connected to a source of liquid under pressure in a manner similar to the sonic apparatus of FIG. 1. The blade 215 is excited into vibrations by a vibration genertaor (not shown) through a piston member 203 in a manner which is similar to the sonic apparatus 10.

The output ports 220 are disposed along the longitudinal axis of the blade 212 at the free end 214. In this position, the output ports 220 reduce the growing or extrusion time of the liquid column from the output ports 220 for each cycle because the liquid column starts to grow at one displacement of the blade 212 and is sheared at the other displacement of the blade 212.

In the operation of the sonic apparatus of FIG. 2, the liquid is fed through the channel 215 and extruded through the output port 220 at a uniform rate. While the liquid is being extruded, the blade 212 is vibrated by the vibration generator thru piston 203. The liquid column from output port 220 is subjected to the same inertial forces as described for the sonic apparatus 10 of FIG. 1, except that the lead portion of the liquid column is sheared at the maximum displacement of the vibrating blade 212 for each half cycle of blade vibration. The sheared lead portions of particles 240 free fall and form into substantially spherical bodies as in the case for free falling liquid droplets.

FIG. 5 shows an annular output port structure 50 having an exponential body portion and a column support member 51 in the channel 52 of the output port structure 50. The column support member 51 supports a liquid column extruded through the channel 52 so that longer lead portions or particles may be grown. The support member 51 prevents the lead portion or particle from falling due to their own weight before being sheared. This feature permits larger particle sizes to be produced by the sonic apparatus in accordance with the invention.

From the foregoing description, it will be appreciated that there has been provided an improved sonic apparatus for converting high viscosity liquids such as liquid plastics and resins, into uniform particles, each having a given mass or weight and a substantially spherical shape. It will be appreciated that variations and modifications of the apparatus and method, within the scope of the invention, will undoubtedly become apparent to those skilled in the art. Accordingly, the foregoing description should be taken merely as illustrative and not in any limiting sense.

What is claimed is:
1. A sonic apparatus for producing substantially uniform particles from a high viscosity liquid comprising
   (a) a frame,
   (b) a blade of flexible and resilient material having one end thereof fixed to said frame and the other end free to vibrate in a flexural mode,
   (c) extrusion means including an output port fixed to said free end of said blade for uniformly extruding a column of said high viscosity liquid therethrough, and
   (d) excitation means coupled to said blade for vibrating said blade in said flexural mode.
2. The invention defined in claim 1 wherein said output port has an external structure having a varying cross-sectional area along the longitudinal axis thereof, said cross-sectional area being smallest at a point distal to said chamber.
3. The invention defined in claim 2 wherein said varying cross-sectional area defines an exponential curve between said distal point and said chamber.
4. The invention defined in claim 2 wherein said varying cross-sectional area defines a sloping straight line between said distal point and said chamber.
5. A sonic apparatus for producing substantially uniform particles from a high viscosity liquid comprising
   (a) a frame,
   (b) a blade of flexible and resilient material having one end thereof fixed to said frame and the other end free to vibrate in a flexural mode,
   (c) extrusion means including an output port fixed to said free end of said blade for uniformly extruding a column of said high viscosity liquid therethrough, and

(d) a hydroacoustic vibration generator coupled to said blade for vibrating said blade in said flexural mode.

6. The invention defined in claim 5 wherein said hydroacoustic vibration generator is coupled to said blade at a point along its length distal to said free end of said blade.

7. A sonic apparatus for producing substantially uniform particles from high viscosity liquid comprising
 (a) vibratile means including a frame and a flexible blade of a given length having one end thereof fixed to said frame and the other end free to vibrate in a flexural mode,
 (b) extrusion means including a plurality of output ports at said free end of said blade for uniformly extruding a correspondingly plurality of columns of said high viscosity liquid therethrough, and
 (c) excitation means for vibrating said blade in a flexural mode at about its resonant frequency and in a direction transverse to said direction of extension of said blade from said frame.

8. A sonic apparatus for producing substantially uniform particles from a viscous liquid comprising
 (a) a frame,
 (b) a member of resilient and flexible material having one end thereof fixed to said frame and the other end free,
 (c) extrusion means including at least one output port disposed at said free end of said member for extruding a continuous column of said liquid therethrough, and
 (d) means coupled to said member for vibrating said member in a flexural mode so that a portion of said column of liquid is separated therefrom during each half cycle of vibration.

9. The invention defined in claim 8, wherein said free end of said member defines an antinode.

10. The invention defined in claim 8, wherein said free end of said member changes its direction of travel when said column of liquid has a maximum inertia.

References Cited
UNITED STATES PATENTS 2,968,833   1/1961   De Haven et al.   264—9
3,231,641   1/1962   Edmunds   264—13

ROBERT F. WHITE, *Primary Examiner.*

ALEXANDER H. BRODMERKEL, *Examiner.*

J. R. HALL, *Assistant Examiner.*